US011832300B2

(12) United States Patent
Priyadarshi et al.

(10) Patent No.: US 11,832,300 B2
(45) Date of Patent: Nov. 28, 2023

(54) TECHNIQUES FOR RECOVERING FROM A RANDOM ACCESS MESSAGE FAILURE

(71) Applicant: QUALCOMM Incorporated, San Diego, CA (US)

(72) Inventors: Amit Priyadarshi, Hyderabad (IN); Satish Kumar, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 135 days.

(21) Appl. No.: 17/376,035

(22) Filed: Jul. 14, 2021

(65) Prior Publication Data

US 2023/0017755 A1   Jan. 19, 2023

(51) Int. Cl.
*H04W 74/00* (2009.01)
*H04W 74/04* (2009.01)
*H04W 72/0453* (2023.01)
*H04W 52/14* (2009.01)
*H04L 1/08* (2006.01)

(52) U.S. Cl.
CPC .............. *H04W 74/04* (2013.01); *H04L 1/08* (2013.01); *H04W 52/146* (2013.01); *H04W 72/0453* (2013.01)

(58) Field of Classification Search
CPC ..... H04W 76/27; H04W 52/32; H04W 52/48; H04W 16/14; H04W 28/18; H04W 74/00; H04W 52/36
See application file for complete search history.

(56) References Cited

U.S. PATENT DOCUMENTS

2022/0287107 A1\*   9/2022   Kim ................. H04W 74/0841
2022/0408372 A1\*  12/2022   Feuersaenger ...... H04W 74/006

\* cited by examiner

*Primary Examiner* — Tu X Nguyen
(74) *Attorney, Agent, or Firm* — Holland & Hart LLP

(57) ABSTRACT

Methods, systems, and devices for wireless communications are described. In some examples, a base station may recover a UE from a Msg3 failure during an RA procedure. During the RA procedure, the base station may transmit a RAR message to the UE and in response to the RAR message the UE may transmit an uplink message (e.g., Msg3) to the base station over a first resource indicated in the RAR message. If the base station fails to decode or receive the uplink message over the first resource, the base station may transmit a grant to the UE indicating a second resource for retransmitting the uplink message and the UE may retransmit uplink message to the base station according to the grant.

30 Claims, 12 Drawing Sheets

TECHNIQUES FOR RECOVERING FROM A RANDOM ACCESS MESSAGE FAILURE

FIELD OF TECHNOLOGY

The following relates to wireless communications, including techniques for recovering from a random access (RA) message failure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In order to establish uplink synchronization and radio resource control (RRC) connection with a base station, a UE may undergo an RA procedure (e.g., a contention free RA (CFRA) procedure or contention based RA (CBRA) procedure). During the RA procedure, the UE and the base station may exchange multiple RA messages and the success of the RA procedure may hinge on successful receipt of these RA messages.

SUMMARY

The described techniques relate to improved methods, systems, devices, and apparatuses that support techniques for recovering from a Msg3 failure in an RA procedure. Generally, the described techniques provide for a base station to recover Msg3 (e.g., an RA message) after failing to decode Msg3 from a user equipment (UE) during an RA procedure. As part of the RA procedure (e.g., CFRA procedure), the base station may transmit an RA response (RAR) message to the UE. Upon receiving the RAR message, the UE may move to a connected state (e.g., RRC connected state) and monitor a physical downlink control channel (PDCCH) for control information (e.g., uplink or downlink grant) from the base station. The UE may then transmit Msg3 (e.g., an uplink message) to the base station over resources indicated in the RAR message, where Msg3 may include uplink scheduling information. The base station may monitor for Msg3 and in some examples, may fail to receive or decode Msg3. In the event that the base station fails to decode or receive Msg3, the base station may transmit a grant to the UE instructing the UE to retransmit Msg3 to the base station on the same frequency resources or different frequency resources as indicated in the RAR message. In some examples, the grant may also instruct the UE to adjust a transmit power or a modulation and coding scheme (MCS) for retransmitting Msg3. The UE may then retransmit the Msg3 to the base station according to the grant.

A method for wireless communications at a base station is described. The method may include transmitting, as part of a RA procedure, a RAR message to a UE, the RAR message indicating a first resource allocated for transmission of an uplink message of the RA procedure, monitoring, as part of the RA procedure, the first resource for the uplink message, and transmitting, to the UE, a grant indicating a second resource allocated for a retransmission of the uplink message based on the monitoring indicating that the uplink message was unsuccessfully decoded via the first resource.

An apparatus for wireless communications at a base station is described. The apparatus may include a processor, memory coupled with the processor, and instructions stored in the memory. The instructions may be executable by the processor to cause the apparatus to transmit, as part of a RA procedure, a RAR message to a UE, the RAR message indicating a first resource allocated for transmission of an uplink message of the RA procedure, monitor, as part of the RA procedure, the first resource for the uplink message, and transmit, to the UE, a grant indicating a second resource allocated for a retransmission of the uplink message based on the monitoring indicating that the uplink message was unsuccessfully decoded via the first resource.

Another apparatus for wireless communications at a base station is described. The apparatus may include means for transmitting, as part of a RA procedure, a RAR message to a UE, the RAR message indicating a first resource allocated for transmission of an uplink message of the RA procedure, means for monitoring, as part of the RA procedure, the first resource for the uplink message, and means for transmitting, to the UE, a grant indicating a second resource allocated for a retransmission of the uplink message based on the monitoring indicating that the uplink message was unsuccessfully decoded via the first resource.

A non-transitory computer-readable medium storing code for wireless communications at a base station is described. The code may include instructions executable by a processor to transmit, as part of a RA procedure, a RAR message to a UE, the RAR message indicating a first resource allocated for transmission of an uplink message of the RA procedure, monitor, as part of the RA procedure, the first resource for the uplink message, and transmit, to the UE, a grant indicating a second resource allocated for a retransmission of the uplink message based on the monitoring indicating that the uplink message was unsuccessfully decoded via the first resource.

Some examples of the method, apparatuses, and non-transitory computer-readable medium described herein may further include operations, features, means, or instructions for transmitting, to the UE, the grant including a transmit power control (TPC) message instructing the UE to increase a transmit power for the retransmission of the uplink message.

Some examples of the method, apparatuses, and non-transitory computer-readable medium described herein may further include operations, features, means, or instructions for transmitting, to the UE, the grant instructing the UE to decrease a MCS for the retransmission of the uplink message.

Some examples of the method, apparatuses, and non-transitory computer-readable medium described herein may further include operations, features, means, or instructions for transmitting, to the UE, the grant allocating the second resource at a second frequency range that may be the same as a first frequency range of the first resource.

Some examples of the method, apparatuses, and non-transitory computer-readable medium described herein may further include operations, features, means, or instructions for transmitting, to the UE, the grant allocating the second resource at a second frequency range that partially overlaps with or may be different than a first frequency range of the first resource.

Some examples of the method, apparatuses, and non-transitory computer-readable medium described herein may further include operations, features, means, or instructions for transmitting, to the UE, the grant including a TPC message instructing the UE to increase a transmit power for the retransmission of the uplink message, instructing the UE to decrease a MCS for the retransmission of the uplink message, and allocating the second resource at a second frequency range that partially overlaps with or may be different than a first frequency range of the first resource.

Some examples of the method, apparatuses, and non-transitory computer-readable medium described herein may further include operations, features, means, or instructions for monitoring the second resource for the retransmission of the uplink message and transmitting, to the UE, a second grant indicating a third resource allocated for a second retransmission of the uplink message based on the monitoring indicating that the retransmission of the uplink message was unsuccessfully decoded via the second resource.

Some examples of the method, apparatuses, and non-transitory computer-readable medium described herein may further include operations, features, means, or instructions for transmitting, to the UE, the second grant including a TPC message instructing the UE to increase a transmit power for the second retransmission of the uplink message via the third resource.

Some examples of the method, apparatuses, and non-transitory computer-readable medium described herein may further include operations, features, means, or instructions for monitoring the third resource for the second retransmission of the uplink message and transmitting, to the UE, a third grant indicating a fourth resource allocated for a third retransmission of the uplink message based on the monitoring indicating that the second retransmission of the uplink message was unsuccessfully decoded via the third resource.

Some examples of the method, apparatuses, and non-transitory computer-readable medium described herein may further include operations, features, means, or instructions for transmitting, to the UE, the third grant including a TPC message instructing the UE to increase a transmit power for the third retransmission of the uplink message via the fourth resource.

Some examples of the method, apparatuses, and non-transitory computer-readable medium described herein may further include operations, features, means, or instructions for transmitting, to the UE, the third grant allocating the fourth resource at a fourth frequency range that that partially overlaps with or may be different than a third frequency range of the third resource.

Some examples of the method, apparatuses, and non-transitory computer-readable medium described herein may further include operations, features, means, or instructions for transmitting, to the UE, the third grant instructing the UE to decrease a MCS for the third retransmission of the uplink message via the fourth resource.

Some examples of the method, apparatuses, and non-transitory computer-readable medium described herein may further include operations, features, means, or instructions for incrementing a counter based on the monitoring indicating that the uplink message was unsuccessfully decoded over the first resource and transmitting the grant indicating the second resource for the retransmission of the uplink message based on the counter satisfying a threshold.

Some examples of the method, apparatuses, and non-transitory computer-readable medium described herein may further include operations, features, means, or instructions for initiating a timer based on the monitoring indicating that the uplink message was unsuccessfully decoded over the second resource and terminating the RA procedure based on the timer expiring prior to receipt of the uplink message.

Some examples of the method, apparatuses, and non-transitory computer-readable medium described herein may further include operations, features, means, or instructions for identifying a system frame number (SFN) or a slot to monitor for one or both of the uplink message or the retransmission of the uplink message based on the RAR message.

In some examples of the method, apparatuses, and non-transitory computer-readable medium described herein, transmitting the grant may include operations, features, means, or instructions for transmitting the grant in a control channel corresponding to a connected mode operation by the UE.

Some examples of the method, apparatuses, and non-transitory computer-readable medium described herein may further include operations, features, means, or instructions for receiving, as part of the RA procedure, an initial message including a preamble that may be allocated to the UE for the RA procedure, where transmitting the RAR message may be based one receiving the initial message.

In some examples of the method, apparatuses, and non-transitory computer-readable medium described herein, the uplink message includes a msg3, a scheduling request (SR) message, a connection complete message, or a scheduling information request message.

In some examples of the method, apparatuses, and non-transitory computer-readable medium described herein, the RA procedure includes a CFRA procedure or a non-contention based RA procedure.

DETAILED DESCRIPTION

Figure 1:
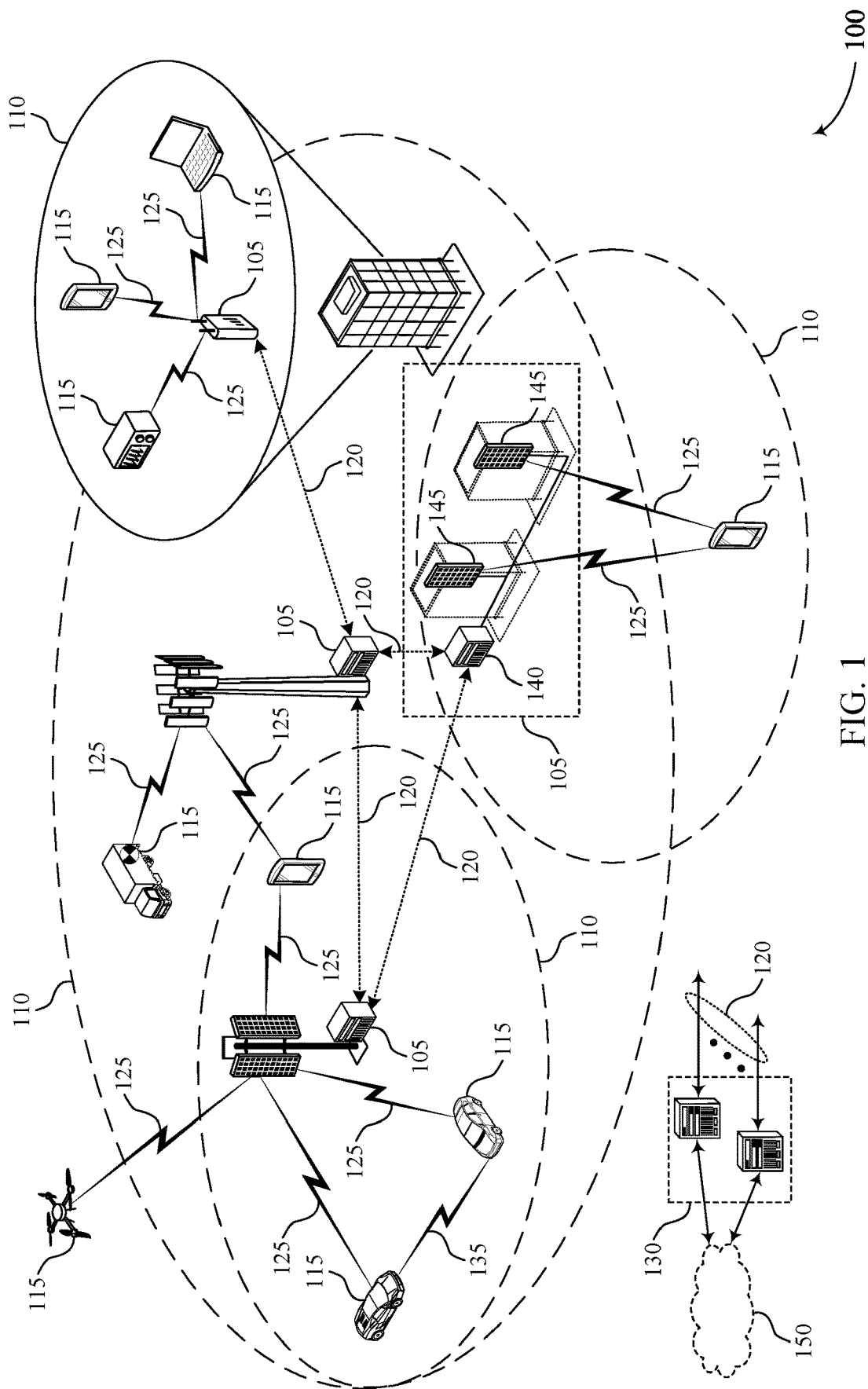
FIGS. 1 and 2 illustrate examples of a wireless communications system that supports techniques for recovering from an RA message failure in accordance with aspects of the present disclosure.

A user equipment (UE) operating in non-standalone (NSA) mode or standalone mode (SA) may undergo a CFRA procedure or other non-contention based RA procedure to add a secondary cell (e.g., establish a connection with a base station operating in accordance to New Radio (NR)). Prior to CFRA, the network may signal to the UE which preamble and resources to use during the CFRA procedure and at the start of the CFRA procedure, the UE may transmit the preamble to a base station in a first message (e.g., Msg1). To acknowledge receipt of the preamble, the base station may transmit a second message to the UE (e.g., RAR message or Msg2), where the second message may include information such as timing alignment information, an RA preamble identifier (RAPID), etc. Upon receiving the second message from the base station, the UE may consider itself in connected mode and transmit a third message (e.g., Msg3) to the base station over resources assigned in the second message. In some examples, the third message may include a cell radio network temporary identifier (C-RNTI) allocated to the UE and may, in some examples, serve as an SR.

Once the UE transmits the third message, the UE may initiate a buffer status report (BSR) timer and monitor for scheduling information from the base station. In some examples, the base station may fail to receive the third message and may not transmit scheduling information to the UE. In such case, the BSR timer may expire and the UE may transmit SRs to the base station which the base station may ignore due to the third message (e.g., Msg3) failure. After the UE exhausts all of the SR attempts, the UE may initiate a CBRA procedure which may also fail because the base station does not have the old C-RNTI context. Continually monitoring for scheduling information (after transmitting SRs or during CBRA) may increase power consumption at the UE.

In some examples, a base station may attempt to recover the third message (e.g., Msg3) after failing to the decode or receive the third message during a CFRA procedure. In some examples, the base station may know the resource on which to receive the third message from the UE. If the base station fails to decode or receive the third message over the resource, the base station may transmit a grant instructing the UE to retransmit the third message. In some examples, the grant may include one or more of a TPC message instructing the UE to increase the transmit power for the retransmission of the third message, instructions to decrease an MCS for the retransmission of the third message, or instructions to transmit the retransmission of the third message over a resource different from the resource indicated in the second message. The UE may perform blind decoding and receive the grant. The UE may then transmit the third message to the base station according to the grant. Using the techniques described herein may allow the base station to recover the third message without excess power consumption at the UE (e.g., blind decoding in every downlink slot, sending multiple SRs, or performing CBRA) during a CFRA procedure.

Aspects of the disclosure are initially described in the context of wireless communications systems. Additional aspects of the disclosure are described in the context of a Msg3 recovery timeline and a process flow. Aspects of the disclosure are further illustrated by and described with reference to apparatus diagrams, system diagrams, and flowcharts that relate to techniques for recovering from an RA message failure.

FIG. 1 illustrates an example of a wireless communications system 100 that supports techniques for recovering from an RA message failure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies (RAT).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a SFN (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

As described herein, the base station 105 may recover Msg3 (e.g., a RA message) after failing to decode Msg3 from a UE 115 during an RA procedure. As part of the RA procedure (e.g., a CFRA procedure or other non-contention based RA procedure), the base station 105 may transmit a RAR message to the UE 115. Upon receiving the RAR message, the UE 115 may transmit Msg3 (e.g., an uplink message) to the base station 105 over resources indicated in the RAR, where Msg3 may include uplink scheduling information. The base station 105 may monitor for Msg3 and in some examples, may fail to receive or decode Msg3. In the event that the base station 105 fails to decode or receive Msg3, the base station 105 may transmit a grant to the UE 115 instructing the UE 115 to retransmit Msg3 to the base station 105 on the same resources or different resources as indicated in the RAR message. In some examples, the grant may also instruct the UE 115 to adjust a transmit power or an MCS for retransmitting Msg3. The UE 115 may then retransmit Msg3 to the base station 105 according to the grant.

Figure 2:
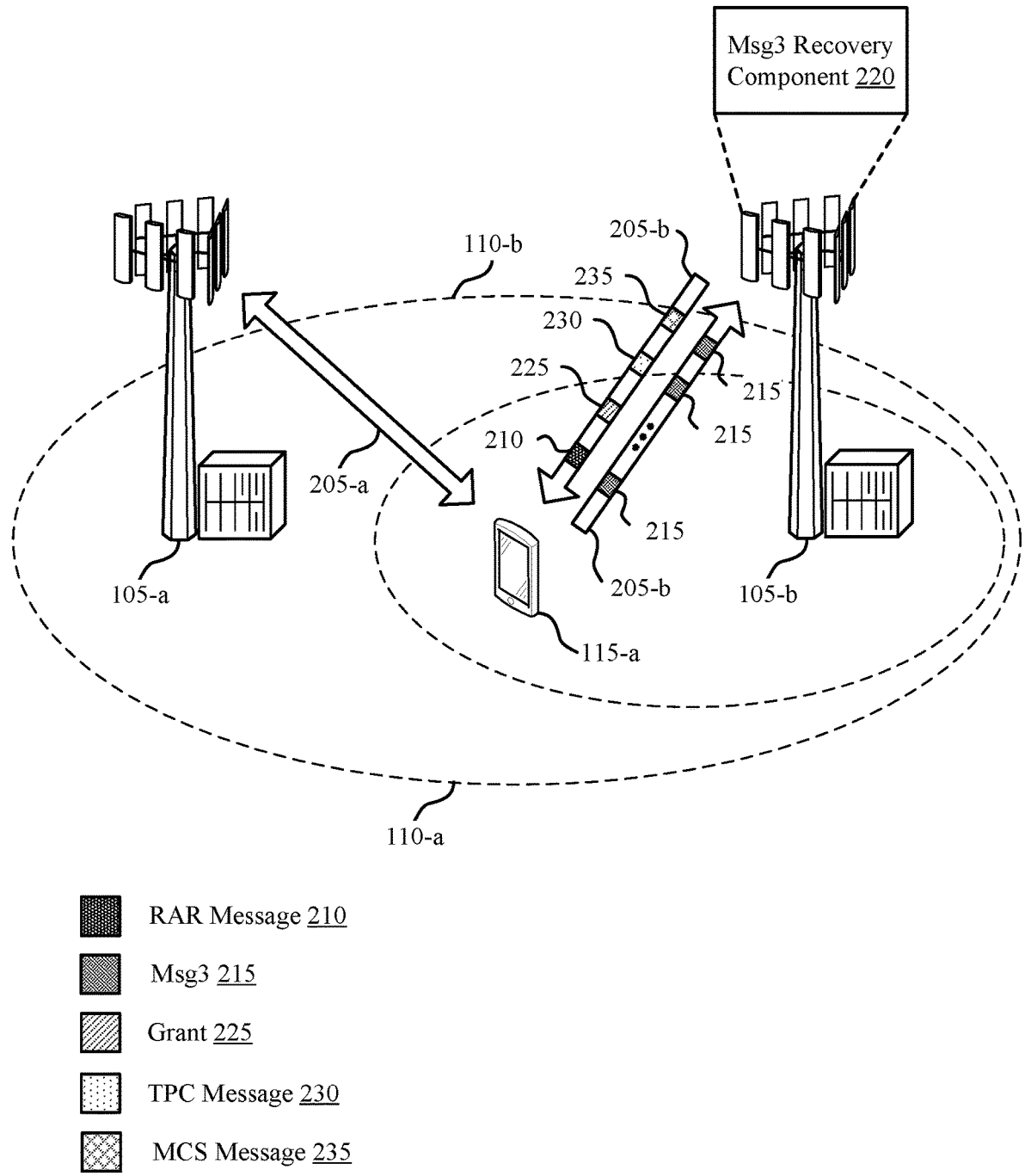

FIG. 2 illustrates an example of a wireless communications system 200 that supports techniques for recovering from an RA message failure in accordance with aspects of the present disclosure. The wireless communications system 200 may include a base station 105-a, a base station 105-b, and a UE 115-a. In some examples, the wireless communications system 200 may implement aspects of a wireless communications system 100. For example, the base station 105-a, the base station 105-b, and the UE 115-a may be examples of base stations 105 and a UE 115 as described with reference to FIG. 1. The base station 105-a may support a coverage area 110-a and the base station 105-b may support a coverage area 110-b. The UE 115-a may be located in one or both of the coverage area 110-a or the coverage area 110-b.

In some examples, the UE 115-a may operate in non-standalone (NSA) mode or standalone mode (SA). In NSA mode, the UE 115-a may be capable of providing information to the network using two different RATs. For example, the UE 115-a may establish a communication link 205-a with the base station 105-a operating in accordance to LTE technology and additionally establish a communication link 205-b with the base station 105-b operating in accordance to NR technology. In some examples, the UE 115-*a* may utilize the communication link 205-*a* for control plane communication and the communication link 205-*b* for user plane communication. As such, the base station 105-*a* may act as a primary node and the base station 105-*b* may act as a secondary node.

In order to establish the communication link 205-*b* with the base station 105-*b* (add a secondary node), the UE 115-*a* may undergo an RA procedure or more specifically, a CFRA procedure. Before the RA procedure, the network may allocate resources for the RA procedure and an RA preamble to the UE 115-*a*. As one example, the base station 105-*a* may transmit a RRC reconfiguration message indicating the resources to use for the RA procedure and the RA preamble to the UE 115-*a*. At the beginning of the grant-based RA procedure, the UE 115-*a* may transmit the RA preamble (Msg1) to the base station 105-*b* over a physical RA channel (PRACH) to obtain uplink synchronization. To acknowledge receipt of the preamble, the base station 105-*b* may transmit a RAR message 210 (Msg2) to the UE 115-*a*. The RAR message 210 may include timing alignment information, an RA preamble identifier (RAPID), an indication of a resource on which to transmit Msg3 215 (e.g., an uplink message), etc. Once the UE 115-*a* receives the RAR message 210, the UE 115-*a* may declare itself in connected mode and transmit Msg3 215 to the base station 105-*b* via the resource indicated in the RAR message. Msg3 215 may serve as an SR and may include a C-RNTI of the UE 115-*a*.

In one example, the base station 105-*b* may successfully receive and decode Msg3 215 from the UE 115-*a*. In such example, the base station 105-*b* may transmit downlink control information (DCI) to the UE 115-*a* scheduling the UE 115-*a* to transmit pending data. The base station 105-*b* may generate the DCI and the UE 115-*b* may identify the DCI using the C-RNTI of the UE 115-*b* indicated in Msg3 215. In another example, the base station 105-*b* may not receive or decode Msg3 215 successfully. The base station 105-*b* may not receive or decode Msg3 215 successfully because a transmit power for transmitting Msg3 (e.g., PRACH target power) may be configured to be a low value (e.g., value below a threshold).

When the base station 105-*b* does not receive or decode Msg3 215 successfully, the base station 105-*b* may assume that the RA preamble transmission (e.g., Msg1) from the UE 115-*a* was a false decode and the base station 105-*b* may not transmit DCI to the UE 115-*a*. In some examples, even if base station 105-*a* does not interpret the RA preamble transmission as a false decode upon failure to decode Msg3 215, the base station 105-*a* may not have a mechanism to recover Msg3 215 and in addition, the base station 105-*a* may not be capable of transmitting feedback (e.g., acknowledgement (ACK) or negative acknowledgement (NACK)) to inform the UE 115-*a* whether Msg3 215 was successfully decoded. As such, the UE 115-*a* may still operate as though the base station 105-*b* did receive and decode Msg3 215 successfully. That is, the UE 115-*a* may perform blind decoding in some or every downlink slot in anticipation of receiving DCI from the base station 105-*b*. When the UE 115-*a* does not receive DCI from the base station 105-*b* upon expiration of a BSR timer (e.g., a periodBSR-Timer), the UE 115-*a* may repeatedly transmit SRs until a counter (e.g., sr-TransMax) is exhausted. After exhausting all SR transmission opportunities, the UE 115-*a* may fall back to a CBRA procedure. But because the base station 105-*b* no longer has the old C-RNTI context which was allocated to the UE 115-*a* for CFRA, the CBRA procedure may fail. Performing blind decoding of a control channel (e.g., PDCCH) in some or every downlink slot after transmitting Msg3 in an attempt to receive scheduling information from the base station 105-*b* as well as repeatedly transmitting SRs and performing CBRA may significantly increase power consumption at the UE 115-*a*.

As described herein, the base station 105-*b* may include a Msg3 recovery component 220. The Msg3 recovery component 220 may support recovery of Msg3 215 in the event that the base station 105-*b* fails to receive or decode Msg3 215 during the RA procedure (e.g., CFRA procedure). In some examples, the base station 105-*b* may schedule the UE 115-*a* to transmit Msg3 215 in a first resource (e.g., system frame number or slot) for based on the RAR message 210 and monitor the first resource for Msg3 215. If the base station 105-*b* is unable to decode the first resource to obtain Msg3 215, the base station 105-*b* may utilize the Msg3 recovery component 220. Using the Msg3 recovery component 220, the base station 105-*b* may transmit a grant 225 (e.g., DCI, such as DCI UL 0_0) to the UE 115-*a*, where the grant 225 indicates a second resource for retransmission of Msg3 215. In some examples, the second resource may be the same frequency as the first resource. That is, the second resource may be at a same frequency range as the first resource, but later in time. Alternatively, the second resource may be different from the first resource. That is, the second resource may be a frequency range that partially overlaps or is different from the frequency range of the first resource, but later in time.

In some examples, the base station 105-*b* may adjust a transmit power at the UE 115-*a* as part of Msg3 recovery. For example, upon failure of decoding Msg3 215, the base station 105-*b* may transmit a TPC message 230 to the UE 115-*a*, where the TPC message 230 may instruct the UE 115-*a* to increase the transmit power for transmitting the retransmission of Msg3 215 (e.g., comparative to the transmit power used to transmit the initial uplink message 215). Additionally or alternatively, the base station 105-*b* may adjust an MCS used at the UE 115-*a* as part of Msg3 recovery. For example, upon failure of decoding Msg3 215, the base station 105-*b* may transmit an MCS message 235 to the UE 115-*a*, where the MCS message 235 may instruct the UE 115-*a* to decrease the MCS used to transmit the retransmission of Msg3 215 (e.g., comparative to the MCS used to transmit the initial Msg3 215). In some examples, the grant 225 may include the TPC message 230 and the MCS message 235. Because the UE 115-*a* may perform blind decoding in every downlink slot after transmitting the initial Msg3 215, the UE 115-*a* may detect the grant 225 and transmit the retransmission of Msg3 215 according to the grant 225. That is, the UE 115-*a* may transmit the retransmission of Msg3 215 at an increased transmit power, using a decreased MCS, or via the second resource that is different from or the same as the first resource.

In some cases, the base station 105-*b* may repeatedly transmit the grant 225 to the UE 115-*a* until Msg3 215 is successfully decoded at the base station 105-*b*. For example, if the base station 105-*b* does not decode the retransmission of Msg3 215 successfully, the base station 105-*b* may transmit a second grant 225 to the UE 115-*a* scheduling a second retransmission of Msg3 215.

In some examples, the base station 105-*b* may implement a timer or a counter in order to avoid excessive retransmissions of the grant 225 (e.g., in the case that Msg1 was a false decode). When the base station 105-*b* fails to detect Msg3 215 from the UE 115-*a*, the base station 105-*b* may initiate a timer. If the base station 105-*b* does not successfully receive and decode Msg3 215 (e.g., via repeated retransmission of Msg3 215) prior to expiration of the timer, the base station 105-*b* may abort the CFRA procedure. As another example, the base station 105-*b* may increment a counter for each time the base station 105-*b* does not receive and decode Msg3 215 (repeated retransmissions of Msg3 215). If the counter exceeds a threshold, the base station 105-*b* may abort the RA procedure (e.g., the CFRA procedure). Using the techniques as described herein may allow a base station 105-*b* to recovery from an Msg3 failure during an RA procedure resulting in a decrease in power consumption at the UE 115-*a*.

Figure 3:
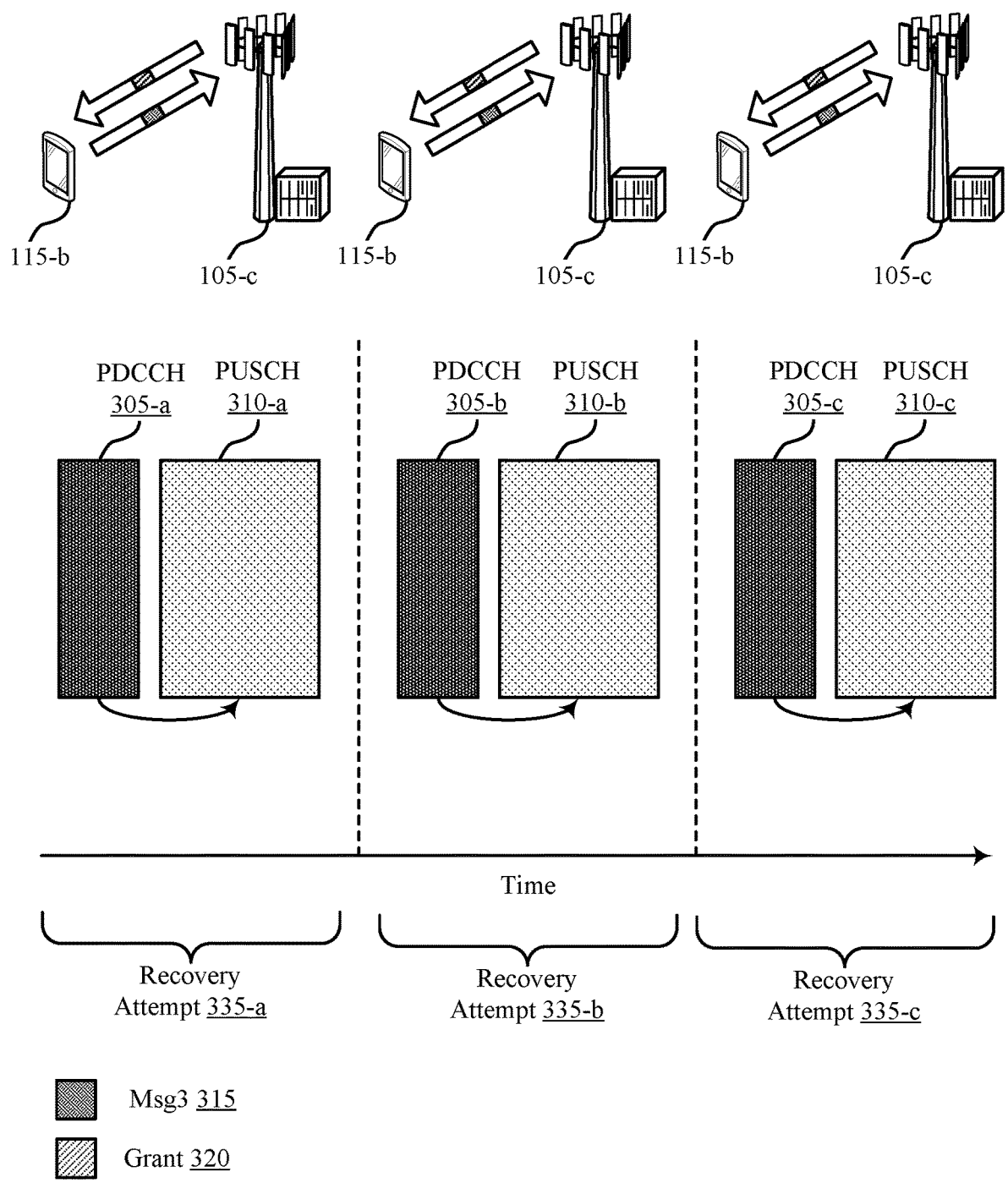
FIG. 3 illustrates an example of a Msg3 recovery timeline that supports techniques for recovering from an RA message failure in accordance with aspects of the present disclosure.

FIG. 3 illustrates an example of an Msg3 recovery timeline 300 that supports techniques for recovering from an RA message failure in accordance with aspects of the present disclosure. The Msg3 timeline 300 may include a base station 105-*c* and a UE 115-*b*. In some examples, the Msg3 recovery timeline 300 may implement aspects of a wireless communications system 100 and a wireless communications system 200. For example, the base station 105-*c* and the UE 115-*b* may be examples of a base station 105 and a UE 115 as described with reference to FIGS. 1 and 2.

As described with reference to FIG. 2, the UE 115-*b* operating in NSA mode may undergo an RA procedure (e.g., a CFRA procedure or other non-contention based RA procedure) to add a secondary cell (e.g., establish a connection with base station 105-*c*). During the RA procedure, the UE 115-*b* may transmit Msg3 315 (e.g., an uplink message) to the base station 105-*c* and in some cases, the base station 105-*c* may fail to decode Msg3 315. When the base station 105-*c* is unable to receive or decode Msg3 315, the base station 105-*c* may perform one or more recovery attempts 335 in order to recover Msg3 315.

In one example, the UE 115-*b* may transmit an initial transmission of Msg3 315 (e.g., during a CFRA procedure) to the base station 105-*c* and the base station 105-*c* may fail to decode or receive the initial transmission of Msg3 315. In such example, the base station 105-*c* may perform a recovery attempt 335-*a*. During the recovery attempt 335-*a*, the base station 105-*c* may schedule the UE 115-*b* to transmit a first retransmission of Msg3 315. For example, the base station 105-*c* may transmit DCI (e.g., DCI UL_0_0) over a PDCCH 305-*a*, where the DCI instructs the UE 115-*b* to transmit the first retransmission of Msg3 315 over the physical uplink shared channel (PUSCH) 310-*a* using the same resource (e.g., frequency resources) as provided in a RAR message (e.g., received previously as part of the CFRA procedure). Because the UE 115-*b* may assume that it is connected mode after receiving the RAR message, the UE 115-*b* may perform blind decoding in every downlink slot after receiving the RAR message. That is, the UE 115-*b* may perform blind decoding on the physical downlink control channel (PDCCH) 305-*c* and read the DCI. After reading the DCI, the UE 115-*b* may transmit the first retransmission of Msg3 315 over the resource as indicated in the DCI.

In some examples, the base station 105-*c* may fail to receive or decode the first retransmission of Msg3 315. In such case, the base station 105-*c* may perform a recovery attempt 335-*b*. During the recovery attempt 335-*b*, the base station 105-*c* may schedule the UE 115-*b* to transmit a second retransmission of Msg3 315. For example, the base station 105-*c* may transmit DCI (e.g., DCI UL_0_0) over a PDCCH 305-*b*, where the DCI instruct the UE 115-*b* to transmit the second retransmission of Msg3 315 over the PUSCH 310-*b* using the same resource (e.g., frequency resource) as provided in the RAR message. Additionally, the DCI may include an indication of a transmit power for transmitting the second retransmission of Msg3 315. In some examples, the transmit power may be greater than the transmit power used to transmit the first retransmission of Msg3 315. Because the UE 115-*b* may assume that it is connected mode after receiving the RAR message, the UE 115-*b* may perform blind decoding in every downlink slot after receiving the RAR message. That is, the UE 115-*b* may perform blind decoding on the PDCCH 305-*b* and read the DCI. After reading the DCI, the UE 115-*b* may transmit the second retransmission of Msg3 315 over the resource using the transmit power as indicated in the DCI.

In some examples, the base station 105-*c* may fail to receive or decode the second retransmission of Msg3 315. In such case, the base station 105-*c* may perform a recovery attempt 335-*c*. During the recovery attempt 335-*c*, the base station 105-*c* may schedule the UE 115-*b* to transmit a third retransmission of Msg3 315. For example, the base station 105-*c* may transmit DCI (e.g., DCI UL_0_0) over a PDCCH 305-*c*, where the DCI instructs the UE 115-*b* to transmit the third retransmission of Msg3 315 over the PUSCH 310-*c* using the same resource (e.g., frequency resource) or different resource (e.g., frequency resource) as provided in a RAR message (e.g., received previously as part of the CFRA procedure). In some examples, the DCI may also include an indication of a transmit power for transmitting the second retransmission of Msg3 315. The transmit power may be larger than the transmit power used to transmit the second retransmission of Msg3 315. In some examples, the DCI may also include an indication of an MCS for transmitting the third retransmission of Msg3 315. The MCS may be lower than the MCS used to transmit the second retransmission of Msg3 315. Because the UE 115-*b* may assume that it is connected mode after receiving the RAR message, the UE 115-*b* may perform blind decoding in every downlink slot after receiving the RAR message. That is, the UE 115-*b* may perform blind decoding on the PDCCH 305-*c* and read the DCI. After reading the DCI, the UE 115-*b* may transmit the third retransmission of Msg3 315 over the resource according to the transmit power or MCS as indicated in the DCI. In some examples, if the base station 105-*c* does not receive or decode the third retransmission of Msg3 315, the base station 105-*c* may terminate the RA procedure. Using the techniques as described herein may allow a base station 105-*c* to recover Msg3 transmitted by the UE 115-*b* during an RA procedure without the UE 115-*b* performing blind decoding in every downlink slot in anticipation of receiving scheduling information, repeated transmission of SRs, or re-RACH procedures (e.g., CBRA) which may conserve power and resources.

Figure 4:
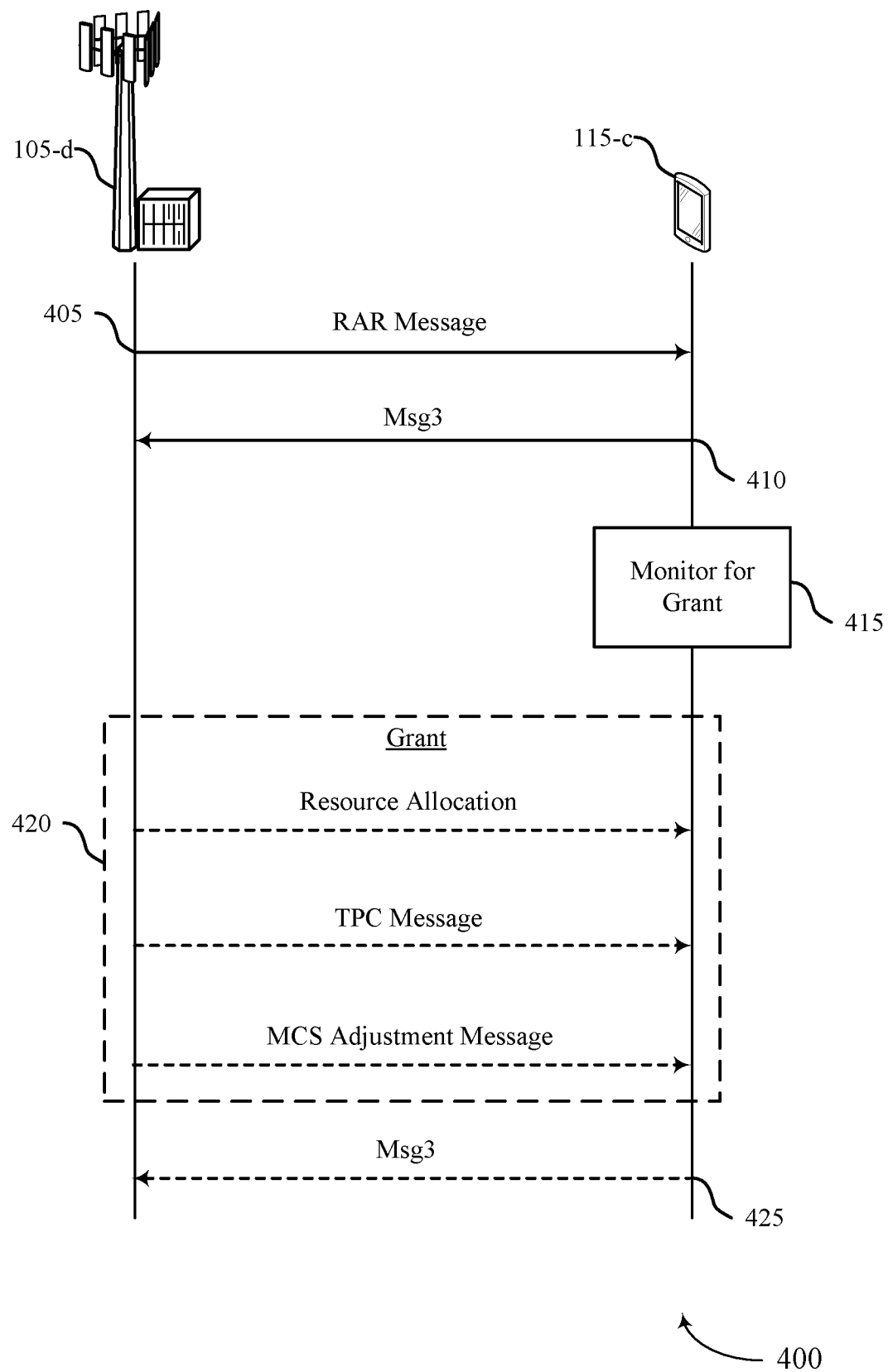
FIG. 4 illustrates an example of a process flow that supports techniques for recovering from an RA message failure in accordance with aspects of the present disclosure.

Although FIG. 4 illustrates the recovery attempts 335 occurring in the following order: recovery attempt 335-*a*, recovery attempt 335-*b*, and recovery attempt 335-*c*. It is understood that the recovery attempts 335 may occur in any order (e.g., recovery attempt 335-*b* followed by recovery attempt 335-*a* followed by recovery attempt 335-*c*). For example, a single grant may adjust one or more of a TPC, an MCS, a resource allocation, or any combination thereof. For example, an initial grant may adjust the MCS, a next grant may adjust the TPC, and a subsequent grant may adjust uplink time-frequency resources (e.g., a resource allocation). In another example, an initial grant may adjust the TPC, a next grant may adjust the resource allocation (e.g., uplink time-frequency resources), a subsequent grant may adjust each of the MCS, resource allocation, and the TPC, and so forth. Moreover, each of the TPC, the MCS, and the resource allocation may be adjusted one or more times over a set of grants. Additionally, although FIG. 4 illustrates each recovery attempt 335 occurring once with the total number of recovery attempts 335 being three, it is understood that each recovery attempt 335 (e.g., recovery attempt 335-a, recovery attempt 335-b, and recovery attempt 335-c) may be repeated any number of times and the total number of recovery attempts 335 may be defined or optimized by the network and may be implementation specific.

FIG. 4 illustrates an example of a process flow 400 that supports techniques for recovering from an RA message failure in accordance with aspects of the present disclosure. In some examples, the process flow 400 may implement or be implemented by aspects of a wireless communications system 100, a wireless communications system 200, and a Msg3 timeline 300. For example, the process flow 400 may include a UE 115-c and a base station 105-d which may be examples of a UE 115 and a base station 105 as described with reference to FIGS. 1-3. The process flow 400 may support the recovery of failed RA messages from the UE 115-c to the base station 105-d during RA procedures. Alternative examples of the following may be implemented, where some steps are performed in a different order then described or are not performed at all. In some cases, steps may include additional features not mentioned below, or further steps may be added.

In some examples, the UE 115-c may operate in NSA mode (or SA mode) and perform an RA procedure (e.g., a CFRA procedure) to establish a connection with the base station 105-d. In some examples, the base station 105-d may operate in accordance to New Radio. During the RA procedure, the UE 115-c may transmit an RA preamble to the base station 105-d. In the case of CFRA, the UE 115-c may receive signaling from the network prior to the CFRA procedure indicating the RA preamble. That is, the network may assign the UE 115-c with the RA preamble.

At 405, the base station 105-d may transmit a RAR message (e.g., Msg2) to the UE 115-c acknowledging receipt of the RA preamble from the UE 115-c. In some examples, the RAR message may indicate a first resource that the UE 115-c may utilize to transmit an uplink message (e.g., Msg3) to the base station 105-d. Upon receiving the RAR message, the UE 115-c may consider itself in connected mode.

In some examples, the base station 105-d may monitor for Msg3 (e.g., an uplink message) from the UE 115-c. In some examples, the base station 105-d may monitor for Msg3 based on the RAR message transmitted at 405. For example, the base station 105-d may determine a SFN or a slot based on the RAR message and monitor a resource (e.g., first resource) corresponding to the determined SFN or slot for Msg3.

At 410, the UE 115-c may transmit Msg3 to the base station 105-d. In some examples, Msg3 may act as an SR and may indicate that the UE 115-c has pending data to transmit.

At 415, the UE 115-c may monitor for a grant (e.g., uplink or downlink grant) from the base station 105-d. In some examples, after receiving (decoding) the RAR message (e.g., decoding msg2 in CFRA mode) at 405, the UE 115-c may consider itself in RRC connected mode and may monitor some or up to every downlink slot for the grant after receiving the RAR message at 405.

At 420, the base station 105-d may fail to decode Msg3 from the UE 115-c and transmit a grant to retransmit Msg3 to the UE 115-c. The grant may include an indication of a resource allocation, where the resource allocation includes a second resource to retransmit Msg3 to the base station 105-d. In some examples, the grant may be included in DCI (e.g., DCI UL_0_0). In some examples, the first resource may at least partially over the second resources in the frequency domain. Alternatively, the first resource may not overlap the second resource in the frequency domain.

Additionally or alternatively, the grant may include a TPC message. The TPC message may indicate a transmit power for retransmitting Msg3. In some examples, the transmit power may be greater than the transmit power used to transmit Msg3 at 410. Additionally or alternatively, the grant may include an MCS adjustment message. The MCS adjustment message may indicate an MCS for retransmitting Msg3. In some examples, the MCS may be smaller than the MCS used to transmit Msg3 at 410.

At 425, the UE 115-c may retransmit Msg3 to the base station 105-d over the second resource. In some examples, the UE 115-c may transmit Msg3 according to one or both of the transmit power indicated in the TPC message or the MCS indicated in the MCS adjustment message. The techniques as described herein may improve quality of service because uplink and downlink sessions may start without timing delays related to other methods of Msg3 recovery. The timing delays of other methods of Msg3 recovery may include repeated SR transmission by the UE 115-c or performing other types of RA procedures (e.g., a CBRA procedure) after a Msg3 failure.

Figure 5:
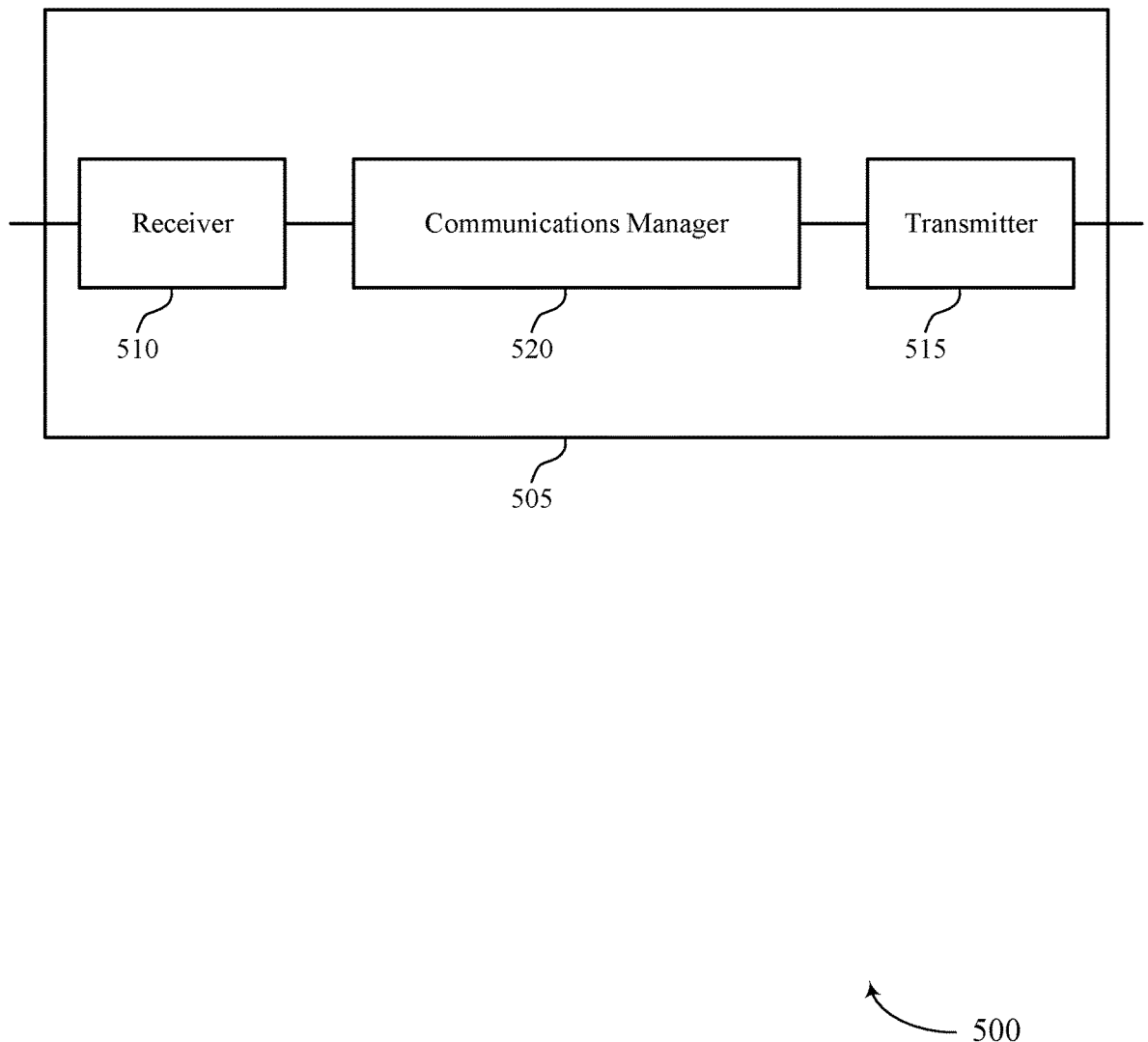
FIGS. 5 and 6 show diagrams of devices that support techniques for recovering from an RA message failure in accordance with aspects of the present disclosure.

FIG. 5 shows a diagram 500 of a device 505 that supports techniques for recovering from an RA message failure in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for recovering from an RA message failure). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for recovering from an RA message failure). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for recovering from an RA message failure as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a base station in accordance with examples as disclosed herein. For example, the communications manager 520 may be configured as or otherwise support a means for transmitting, as part of an RA procedure, a RAR message to a UE, the RAR message indicating a first resource allocated for transmission of Msg3 (e.g., an uplink message) of the RA procedure. The communications manager 520 may be configured as or otherwise support a means for monitoring, as part of the RA procedure, the first resource for Msg3. The communications manager 520 may be configured as or otherwise support a means for transmitting, to the UE, a grant indicating a second resource allocated for a retransmission of Msg3 based on the monitoring indicating that Msg3 was unsuccessfully decoded via the first resource.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources. The methods as described herein may allow for the device 505 to recover a CFRA procedure with a UE falling back to CBRA which may reduce power consumption at the UE. In addition, the resources that may have been used to perform the fallback CBRA procedure may be conserved. Moreover, the tracking of the RA message and the rescheduling of the resources (e.g., for the retransmission of the RA message) may be done at the device 505 effectively decreasing processing at the UE.

Figure 6:
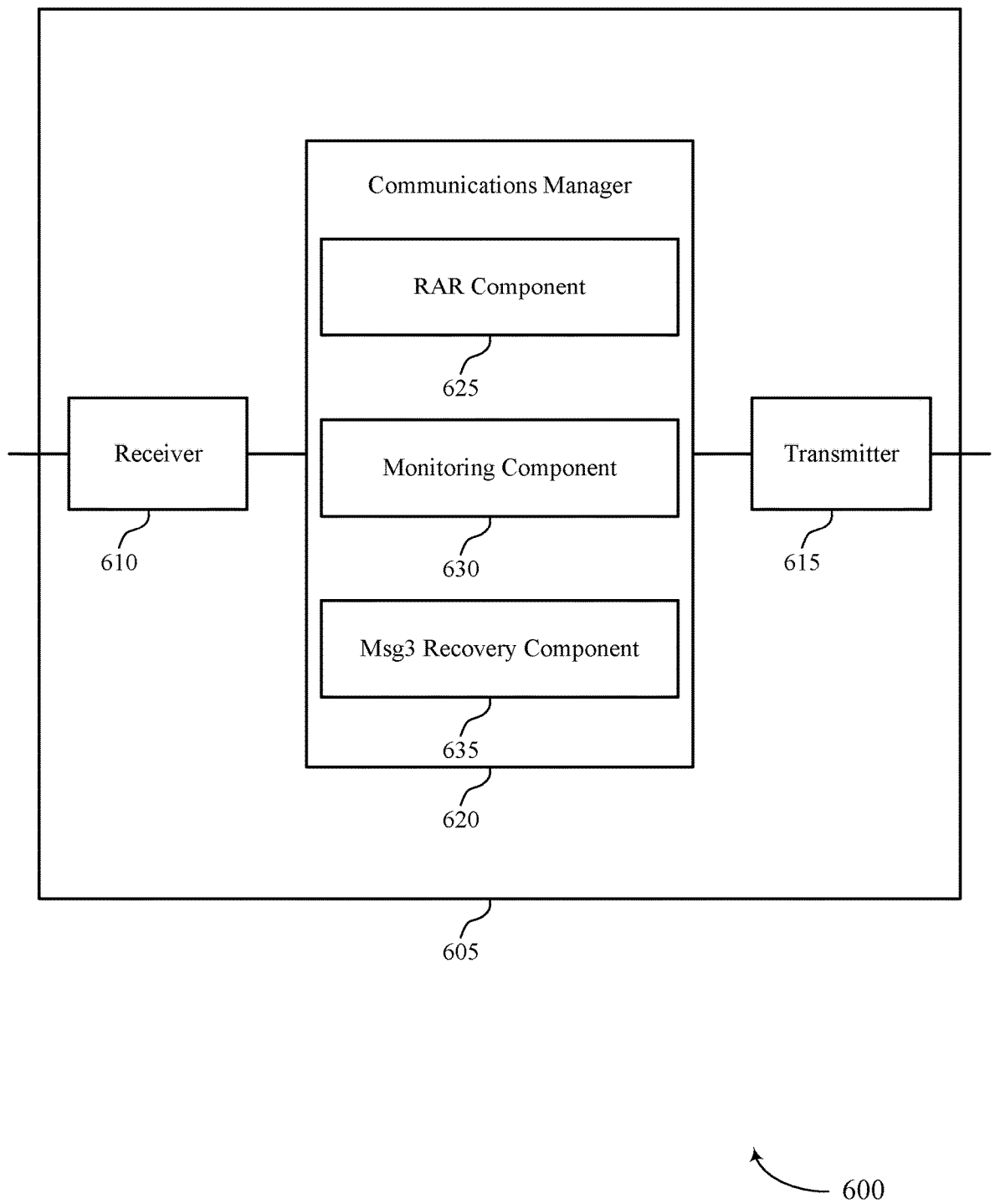

FIG. 6 shows a diagram 600 of a device 605 that supports techniques for recovering from an RA message failure in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for recovering from an RA message failure). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for recovering from an RA message failure). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for recovering from an RA message failure as described herein. For example, the communications manager 620 may include a RAR component 625, a monitoring component 630, a Msg3 recovery component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a base station in accordance with examples as disclosed herein. The RAR component 625 may be configured as or otherwise support a means for transmitting, as part of an RA procedure, a RAR message to a UE, the RAR message indicating a first resource allocated for transmission of Msg3 (e.g., an uplink message) of the RA procedure. The monitoring component 630 may be configured as or otherwise support a means for monitoring, as part of the RA procedure, the first resource for Msg3. The Msg3 recovery component 635 may be configured as or otherwise support a means for transmitting, to the UE, a grant indicating a second resource allocated for a retransmission of Msg3 based on the monitoring indicating that Msg3 was unsuccessfully decoded via the first resource.

Figure 7:
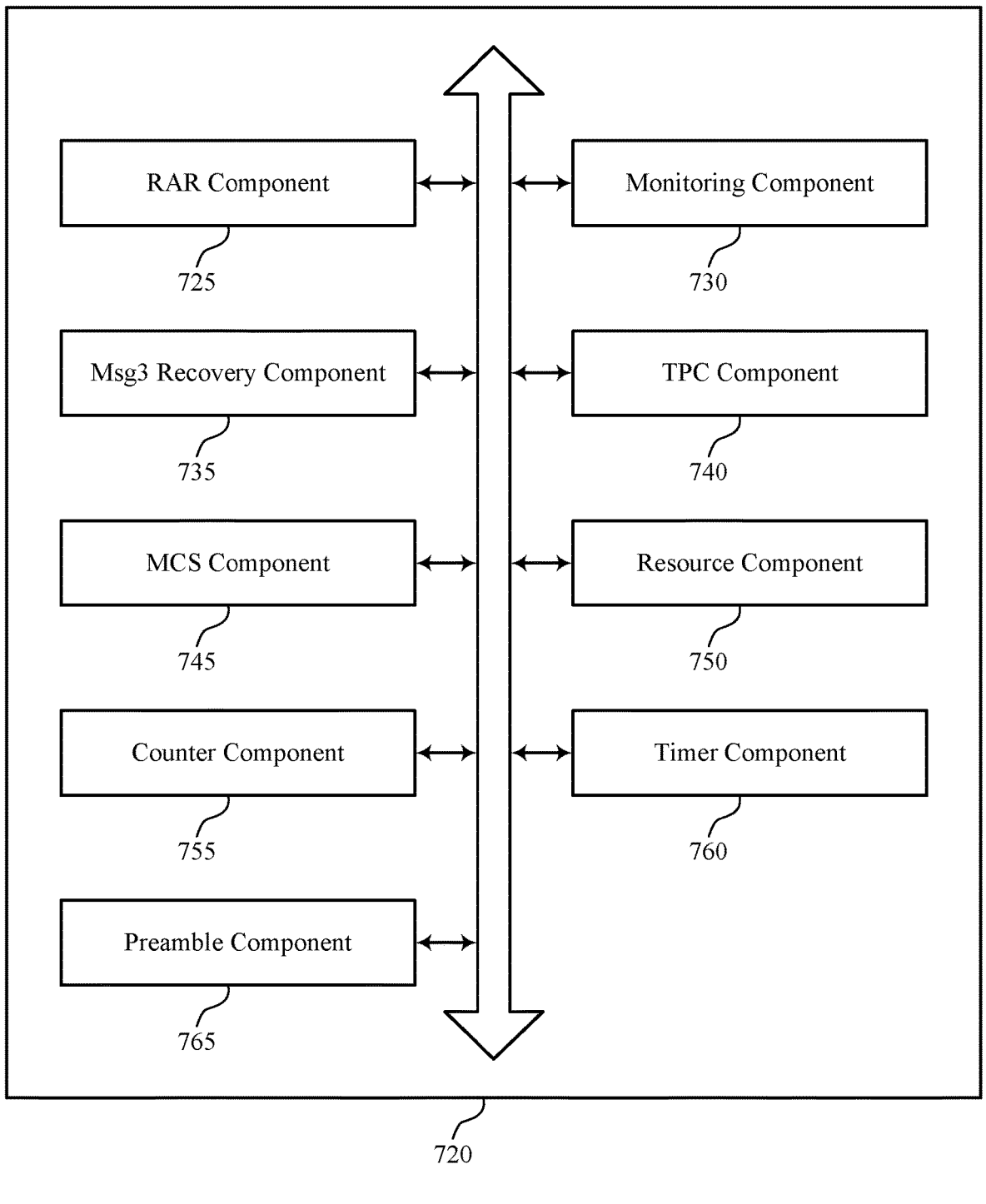
FIG. 7 shows a diagram of a communications manager that supports techniques for recovering from an RA message failure in accordance with aspects of the present disclosure.

FIG. 7 shows a diagram 700 of a communications manager 720 that supports techniques for recovering from an RA message failure in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for recovering from an RA message failure as described herein. For example, the communications manager 720 may include a RAR component 725, a monitoring component 730, an Msg3 recovery component 735, a TPC component 740, an MCS component 745, a resource component 750, a counter component 755, a timer component 760, a preamble component 765, or any combination thereof. Each of these components may communicate, directly or indirectly, with one another (e.g., via one or more buses).

The communications manager 720 may support wireless communications at a base station in accordance with examples as disclosed herein. The RAR component 725 may be configured as or otherwise support a means for transmitting, as part of an RA procedure, a RAR message to a UE, the RAR message indicating a first resource allocated for transmission of Msg3 (e.g., an uplink message) of the RA procedure. The monitoring component 730 may be configured as or otherwise support a means for monitoring, as part of the RA procedure, the first resource for Msg3. The Msg3 recovery component 735 may be configured as or otherwise support a means for transmitting, to the UE, a grant indicating a second resource allocated for a retransmission of Msg3 based on the monitoring indicating that Msg3 was unsuccessfully decoded via the first resource.

In some examples, the TPC component 740 may be configured as or otherwise support a means for transmitting, to the UE, the grant including a TPC message instructing the UE to increase a transmit power for the retransmission of Msg3.

In some examples, the MCS component 745 may be configured as or otherwise support a means for transmitting, to the UE, the grant instructing the UE to decrease an MCS for the retransmission of Msg3.

In some examples, the resource component 750 may be configured as or otherwise support a means for transmitting, to the UE, the grant allocating the second resource at a second frequency range that is the same as a first frequency range of the first resource.

In some examples, the resource component 750 may be configured as or otherwise support a means for transmitting, to the UE, the grant allocating the second resource at a second frequency range that partially overlaps with or is different than a first frequency range of the first resource.

In some examples, the Msg3 recovery component 735 may be configured as or otherwise support a means for transmitting, to the UE, the grant including a TPC message instructing the UE to increase a transmit power for the retransmission of Msg3, instructing the UE to decrease an MCS for the retransmission of Msg3, and allocating the second resource at a second frequency range that partially overlaps with or is different than a first frequency range of the first resource.

In some examples, the monitoring component 730 may be configured as or otherwise support a means for monitoring the second resource for the retransmission of Msg3. In some examples, the Msg3 recovery component 735 may be configured as or otherwise support a means for transmitting, to the UE, a second grant indicating a third resource allocated for a second retransmission of Msg3 based on the monitoring indicating that the retransmission of Msg3 was unsuccessfully decoded via the second resource.

In some examples, the TPC component 740 may be configured as or otherwise support a means for transmitting, to the UE, the second grant including a TPC message instructing the UE to increase a transmit power for the second retransmission of Msg3 via the third resource.

In some examples, the monitoring component 730 may be configured as or otherwise support a means for monitoring the third resource for the second retransmission of Msg3. In some examples, the Msg3 recovery component 735 may be configured as or otherwise support a means for transmitting, to the UE, a third grant indicating a fourth resource allocated for a third retransmission of Msg3 based on the monitoring indicating that the second retransmission of Msg3 was unsuccessfully decoded via the third resource.

In some examples, the TPC component 740 may be configured as or otherwise support a means for transmitting, to the UE, the third grant including a TPC message instructing the UE to increase a transmit power for the third retransmission of Msg3 via the fourth resource.

In some examples, the resource component 750 may be configured as or otherwise support a means for transmitting, to the UE, the third grant allocating the fourth resource at a fourth frequency range that that partially overlaps with or is different than a third frequency range of the third resource.

In some examples, the MCS component 745 may be configured as or otherwise support a means for transmitting, to the UE, the third grant instructing the UE to decrease an MCS for the third retransmission of Msg3 via the fourth resource.

In some examples, the counter component 755 may be configured as or otherwise support a means for incrementing a counter based on the monitoring indicating that Msg3 was unsuccessfully decoded over the first resource. In some examples, the Msg3 recovery component 735 may be configured as or otherwise support a means for transmitting the grant indicating the second resource for the retransmission of Msg3 based on the counter satisfying a threshold.

In some examples, the timer component 760 may be configured as or otherwise support a means for initiating a timer based on the monitoring indicating that Msg3 was unsuccessfully decoded over the second resource. In some examples, the Msg3 recovery component 735 may be configured as or otherwise support a means for terminating the RA procedure based on the timer expiring prior to receipt of Msg3.

In some examples, the monitoring component 730 may be configured as or otherwise support a means for identifying a system frame number or a slot to monitor for one or both of Msg3 or the retransmission of Msg3 based on the RAR message.

In some examples, to support transmitting the grant, the Msg3 recovery component 735 may be configured as or otherwise support a means for transmitting the grant in a control channel corresponding to a connected mode operation by the UE.

In some examples, the preamble component 765 may be configured as or otherwise support a means for receiving, as part of the RA procedure, an initial message including a preamble that is allocated to the UE for the RA procedure, where transmitting the RAR message is based one receiving the initial message.

In some examples, Msg3 includes a msg3, an SR message, a connection complete message, or a scheduling information request message.

In some examples, the RA procedure includes a CFRA procedure.

Figure 8:
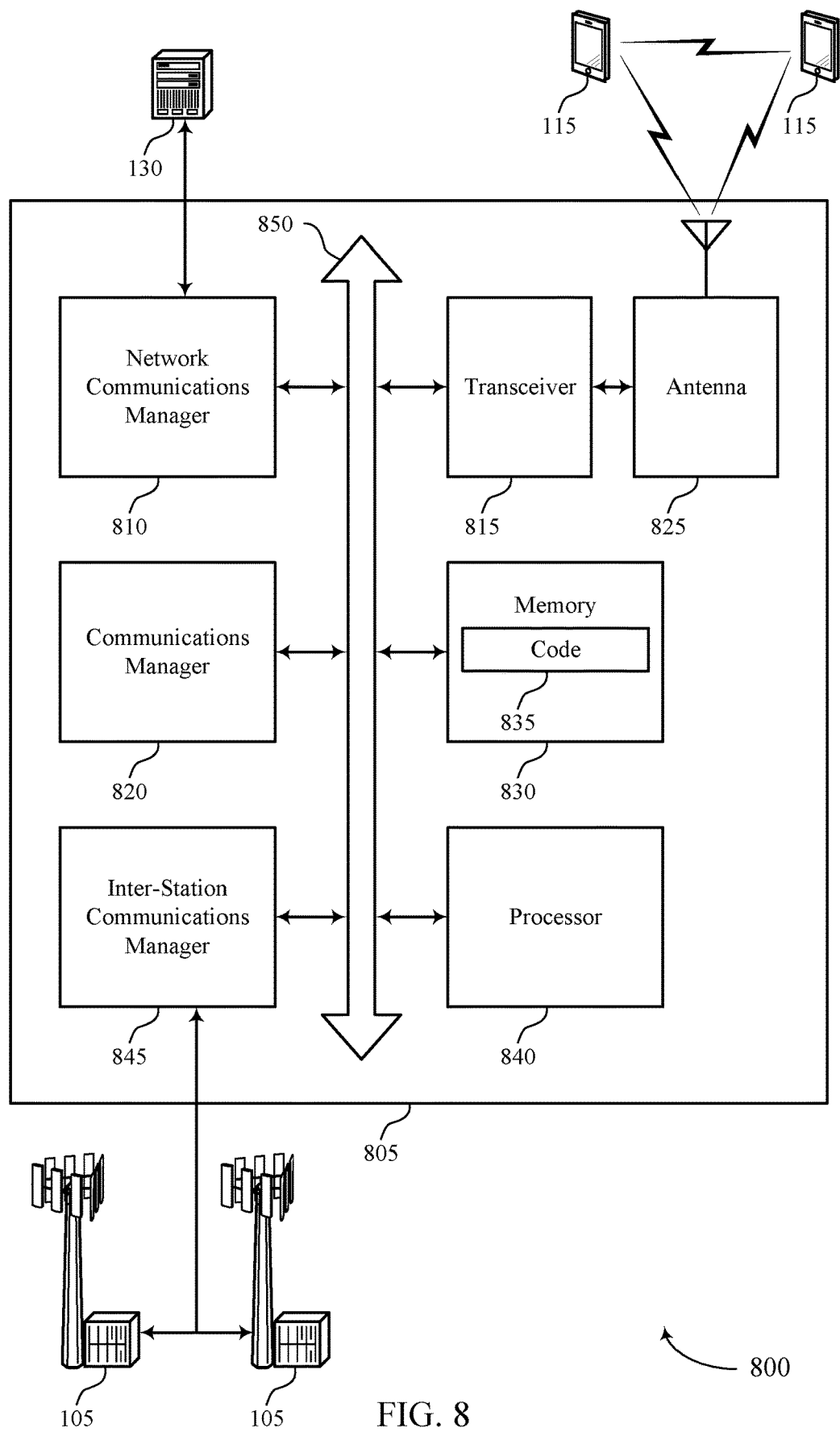
FIG. 8 shows a diagram of a system including a device that supports techniques for recovering from an RA message failure in accordance with aspects of the present disclosure.

FIG. 8 shows a diagram of a system 800 including a device 805 that supports techniques for recovering from an RA message failure in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for recovering from an RA message failure). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communications at a base station in accordance with examples as disclosed herein. For example, the communications manager 820 may be configured as or otherwise support a means for transmitting, as part of an RA procedure, a RAR message to a UE, the RAR message indicating a first resource allocated for transmission of Msg3 (e.g., an uplink message) of the RA procedure. The communications manager 820 may be configured as or otherwise support a means for monitoring, as part of the RA procedure, the first resource for Msg3. The communications manager 820 may be configured as or otherwise support a means for transmitting, to the UE, a grant indicating a second resource allocated for a retransmission of Msg3 based on the monitoring indicating that Msg3 was unsuccessfully decoded via the first resource.

By including or configuring the communications manager 820 in accordance with examples as described herein, the device 805 may support techniques for improved communication reliability, reduced power consumption, and more efficient utilization of communication resources. The method as described herein may allow a UE to transmit multiple retransmissions of an RA message to the device 805 increasing the reliability of the device 805 receiving and decoding the RA message.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for recovering from an RA message failure as described herein, or the processor 840 and the memory 830 may be otherwise configured to perform or support such operations.

Figure 9:
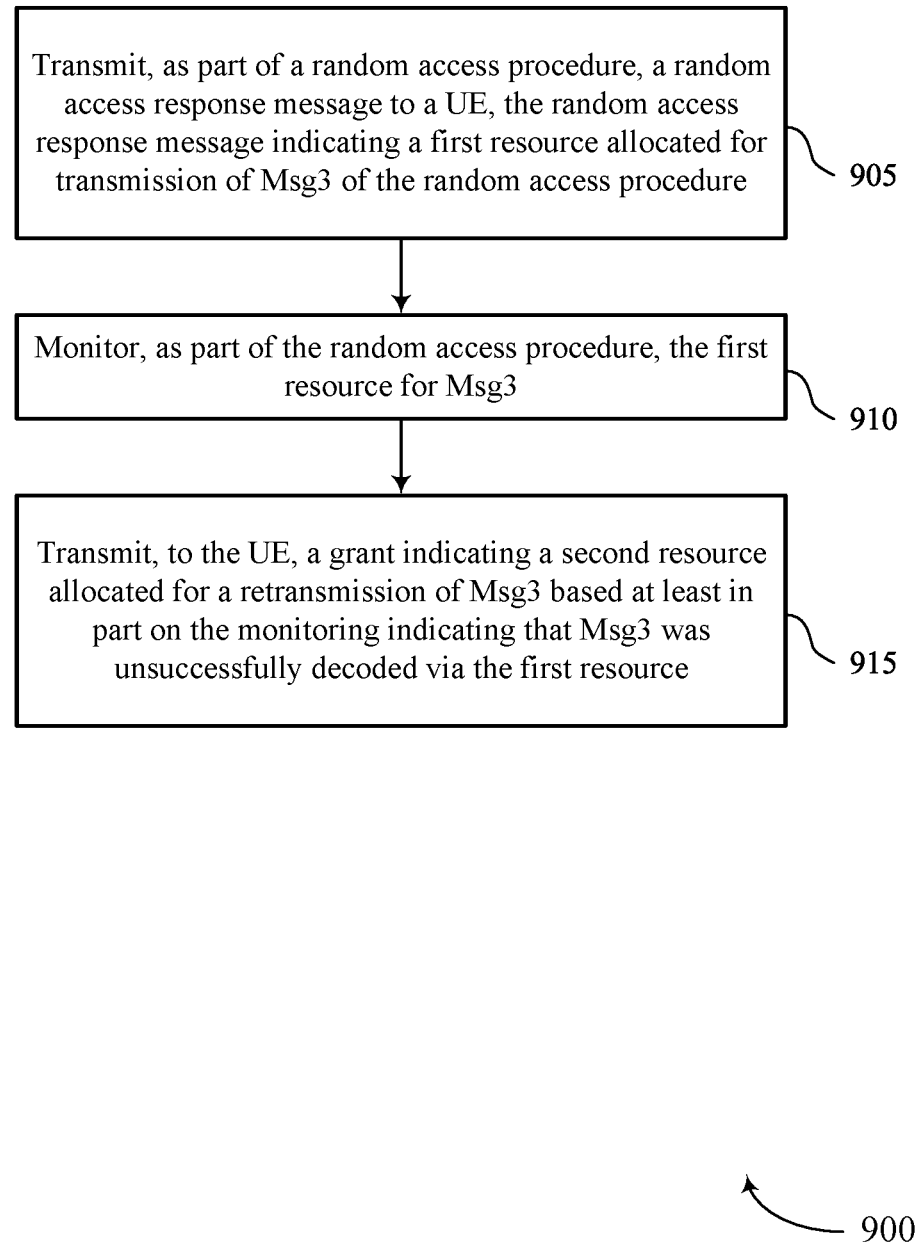
FIGS. 9 through 12 show flowcharts illustrating methods that support techniques for recovering from an RA message failure in accordance with aspects of the present disclosure.

FIG. 9 shows a flowchart illustrating a method 900 that supports techniques for recovering from an RA message failure in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions.

Additionally or alternatively, the base station may perform aspects of the described functions using special-purpose hardware.

At 905, the method may include transmitting, as part of an RA procedure, a RAR message to a UE, the RAR message indicating a first resource allocated for transmission of Msg3 (e.g., an uplink message) of the RA procedure. The operations of 905 may be performed in accordance with examples as disclosed herein. In some examples, aspects of the operations of 905 may be performed by a RAR component 725 as described with reference to FIG. 7.

At 910, the method may include monitoring, as part of the RA procedure, the first resource for Msg3. The operations of 910 may be performed in accordance with examples as disclosed herein. In some examples, aspects of the operations of 910 may be performed by a monitoring component 730 as described with reference to FIG. 7.

At 915, the method may include transmitting, to the UE, a grant indicating a second resource allocated for a retransmission of Msg3 based on the monitoring indicating that Msg3 was unsuccessfully decoded via the first resource. The operations of 915 may be performed in accordance with examples as disclosed herein. In some examples, aspects of the operations of 915 may be performed by an Msg3 recovery component 735 as described with reference to FIG. 7.

Figure 10:
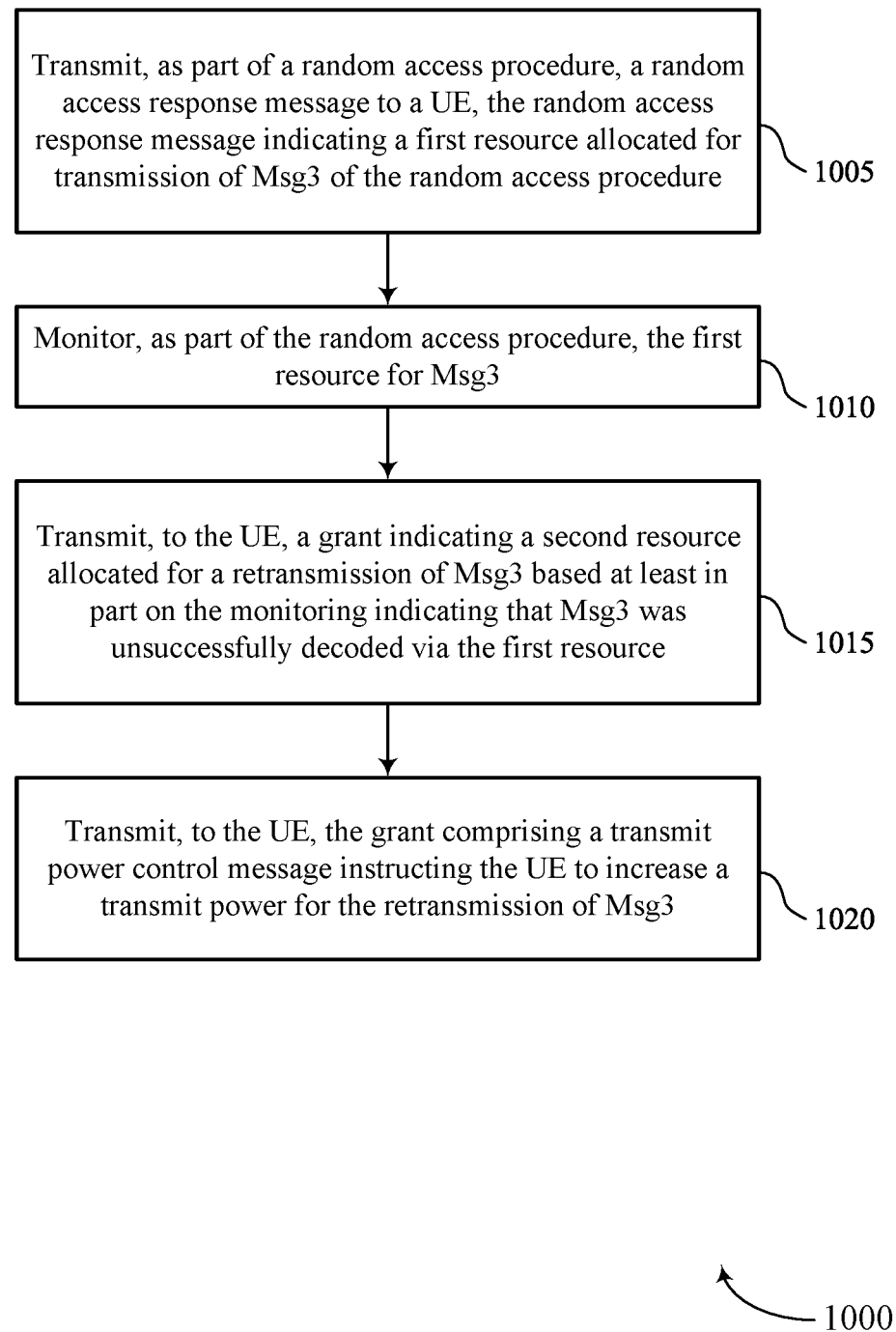

FIG. 10 shows a flowchart illustrating a method 1000 that supports techniques for recovering from an RA message failure in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1005, the method may include transmitting, as part of an RA procedure, a RAR message to a UE, the RAR message indicating a first resource allocated for transmission of Msg3 (e.g., an uplink message) of the RA procedure. The operations of 1005 may be performed in accordance with examples as disclosed herein. In some examples, aspects of the operations of 1005 may be performed by a RAR component 725 as described with reference to FIG. 7.

At 1010, the method may include monitoring, as part of the RA procedure, the first resource for Msg3. The operations of 1010 may be performed in accordance with examples as disclosed herein. In some examples, aspects of the operations of 1010 may be performed by a monitoring component 730 as described with reference to FIG. 7.

At 1015, the method may include transmitting, to the UE, a grant indicating a second resource allocated for a retransmission of Msg3 based on the monitoring indicating that Msg3 was unsuccessfully decoded via the first resource. The operations of 1015 may be performed in accordance with examples as disclosed herein. In some examples, aspects of the operations of 1015 may be performed by an Msg3 recovery component 735 as described with reference to FIG. 7.

At 1020, the method may include transmitting, to the UE, the grant including a TPC message instructing the UE to increase a transmit power for the retransmission of Msg3. The operations of 1020 may be performed in accordance with examples as disclosed herein. In some examples, aspects of the operations of 1020 may be performed by a TPC component 740 as described with reference to FIG. 7.

Figure 11:
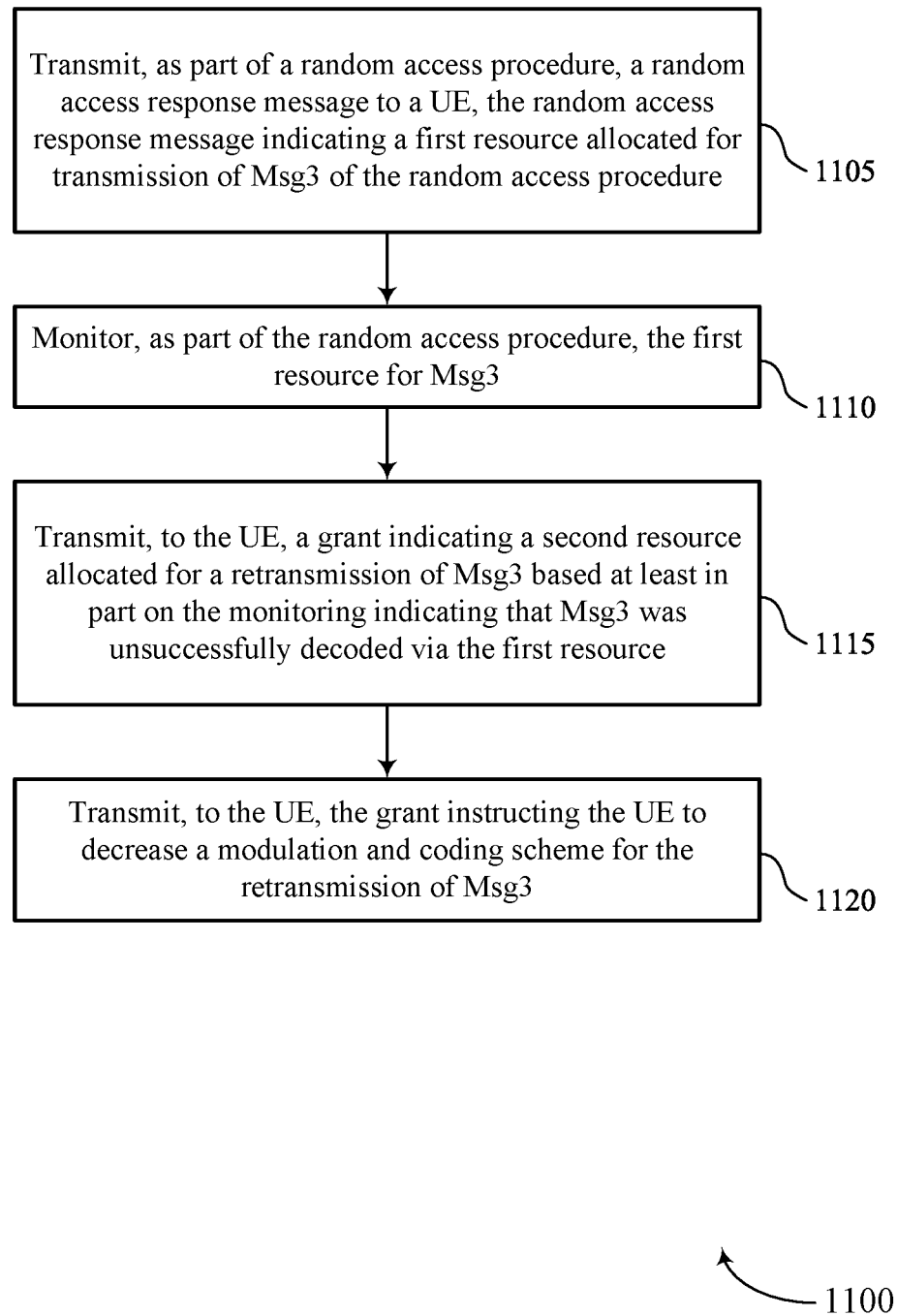

FIG. 11 shows a flowchart illustrating a method 1100 that supports techniques for recovering from an RA message failure in accordance with aspects of the present disclosure. The operations of the method 1100 may be implemented by a base station or its components as described herein. For example, the operations of the method 1100 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1105, the method may include transmitting, as part of an RA procedure, a RAR message to a UE, the RAR message indicating a first resource allocated for transmission of Msg3 (e.g., an uplink message) of the RA procedure. The operations of 1105 may be performed in accordance with examples as disclosed herein. In some examples, aspects of the operations of 1105 may be performed by a RAR component 725 as described with reference to FIG. 7.

At 1110, the method may include monitoring, as part of the RA procedure, the first resource for Msg3. The operations of 1110 may be performed in accordance with examples as disclosed herein. In some examples, aspects of the operations of 1110 may be performed by a monitoring component 730 as described with reference to FIG. 7.

At 1115, the method may include transmitting, to the UE, a grant indicating a second resource allocated for a retransmission of Msg3 based on the monitoring indicating that Msg3 was unsuccessfully decoded via the first resource. The operations of 1115 may be performed in accordance with examples as disclosed herein. In some examples, aspects of the operations of 1115 may be performed by an Msg3 recovery component 735 as described with reference to FIG. 7.

At 1120, the method may include transmitting, to the UE, the grant instructing the UE to decrease an MCS for the retransmission of Msg3. The operations of 1120 may be performed in accordance with examples as disclosed herein. In some examples, aspects of the operations of 1120 may be performed by an MCS component 745 as described with reference to FIG. 7.

Figure 12:
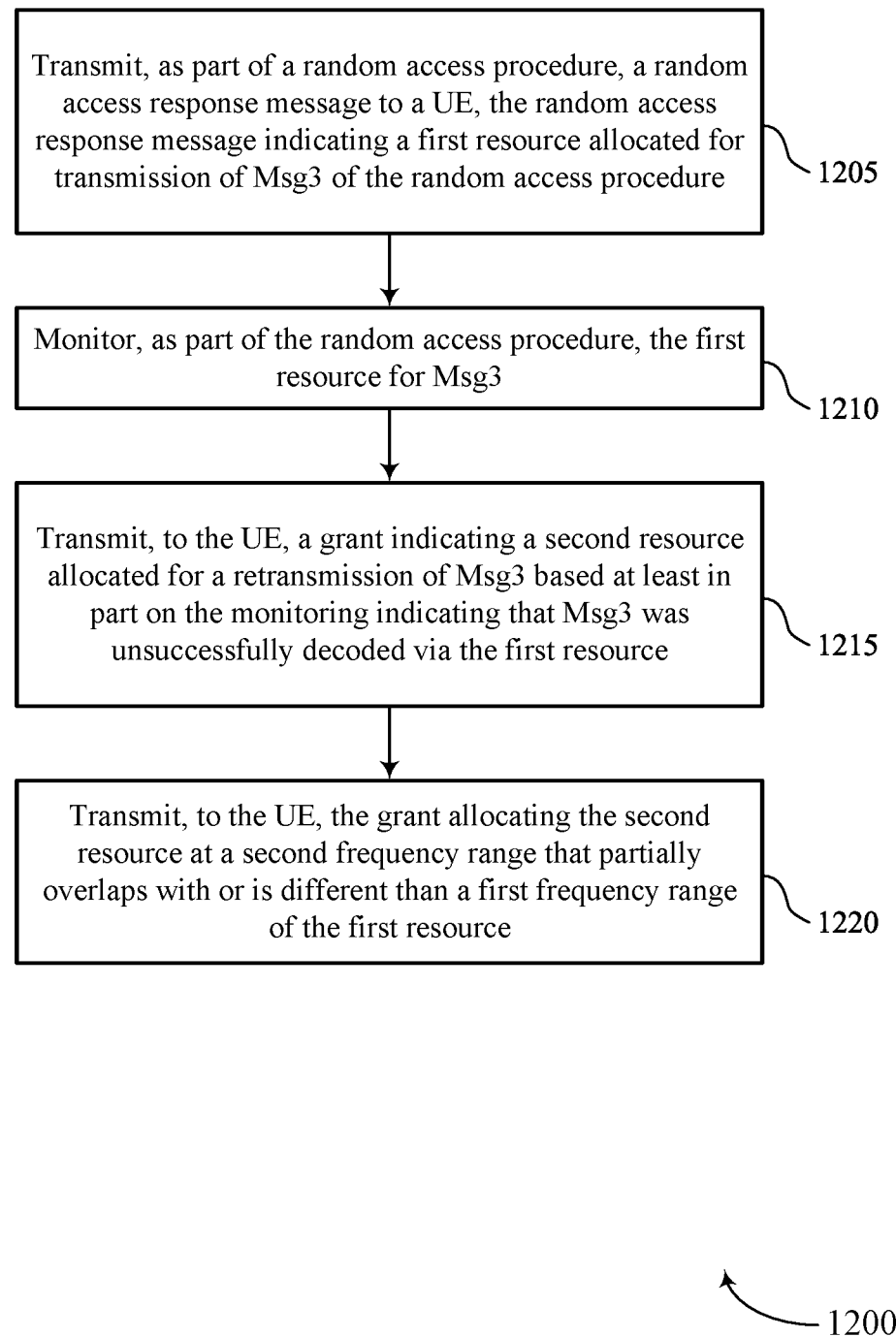

FIG. 12 shows a flowchart illustrating a method 1200 that supports techniques for recovering from an RA message failure in accordance with aspects of the present disclosure. The operations of the method 1200 may be implemented by a base station or its components as described herein. For example, the operations of the method 1200 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1205, the method may include transmitting, as part of an RA procedure, a RAR message to a UE, the RAR message indicating a first resource allocated for transmission of Msg3 (e.g., an uplink message) of the RA procedure. The operations of 1205 may be performed in accordance with examples as disclosed herein. In some examples, aspects of the operations of 1205 may be performed by a RAR component 725 as described with reference to FIG. 7.

At 1210, the method may include monitoring, as part of the RA procedure, the first resource for Msg3. The operations of 1210 may be performed in accordance with examples as disclosed herein. In some examples, aspects of the operations of 1210 may be performed by a monitoring component 730 as described with reference to FIG. 7.

At 1215, the method may include transmitting, to the UE, a grant indicating a second resource allocated for a retransmission of Msg3 based on the monitoring indicating that Msg3 was unsuccessfully decoded via the first resource. The operations of 1215 may be performed in accordance with examples as disclosed herein. In some examples, aspects of the operations of 1215 may be performed by an Msg3 recovery component 735 as described with reference to FIG. 7.

At 1220, the method may include transmitting, to the UE, the grant allocating the second resource at a second frequency range that partially overlaps with or is different than a first frequency range of the first resource. The operations of 1220 may be performed in accordance with examples as disclosed herein. In some examples, aspects of the operations of 1220 may be performed by a resource component 750 as described with reference to FIG. 7.

The following provides an overview of aspects of the present disclosure:

Aspect 1: A method for wireless communications at a base station, comprising: transmitting, as part of a RA procedure, a RAR message to a UE, the RAR message indicating a first resource allocated for transmission of an uplink message of the RA procedure; monitoring, as part of the RA procedure, the first resource for the uplink message; and transmitting, to the UE, a grant indicating a second resource allocated for a retransmission of the uplink message based at least in part on the monitoring indicating that the uplink message was unsuccessfully decoded via the first resource.

Aspect 2: The method of aspect 1, further comprising: transmitting, to the UE, the grant comprising a TPC message instructing the UE to increase a transmit power for the retransmission of the uplink message.

Aspect 3: The method of any of aspects 1 through 2, further comprising: transmitting, to the UE, the grant instructing the UE to decrease a MCS for the retransmission of the uplink message.

Aspect 4: The method of any of aspects 1 through 3, further comprising: transmitting, to the UE, the grant allocating the second resource at a second frequency range that is the same as a first frequency range of the first resource.

Aspect 5: The method of any of aspects 1 through 3, further comprising: transmitting, to the UE, the grant allocating the second resource at a second frequency range that partially overlaps with or is different than a first frequency range of the first resource.

Aspect 6: The method of any of aspects 1 through 5, further comprising: transmitting, to the UE, the grant comprising a TPC message instructing the UE to increase a transmit power for the retransmission of the uplink message, instructing the UE to decrease a MCS for the retransmission of the uplink message, and allocating the second resource at a second frequency range that partially overlaps with or is different than a first frequency range of the first resource.

Aspect 7: The method of any of aspects 1 through 6, further comprising: monitoring the second resource for the retransmission of the uplink message; and transmitting, to the UE, a second grant indicating a third resource allocated for a second retransmission of the uplink message based at least in part on the monitoring indicating that the retransmission of the uplink message was unsuccessfully decoded via the second resource.

Aspect 8: The method of aspect 7, further comprising: transmitting, to the UE, the second grant comprising a TPC message instructing the UE to increase a transmit power for the second retransmission of the uplink message via the third resource.

Aspect 9: The method of any of aspects 7 through 8, further comprising: monitoring the third resource for the second retransmission of the uplink message; and transmitting, to the UE, a third grant indicating a fourth resource allocated for a third retransmission of the uplink message based at least in part on the monitoring indicating that the second retransmission of the uplink message was unsuccessfully decoded via the third resource.

Aspect 10: The method of aspect 9, further comprising: transmitting, to the UE, the third grant comprising a TPC message instructing the UE to increase a transmit power for the third retransmission of the uplink message via the fourth resource.

Aspect 11: The method of any of aspects 9 through 10, further comprising: transmitting, to the UE, the third grant allocating the fourth resource at a fourth frequency range that that partially overlaps with or is different than a third frequency range of the third resource.

Aspect 12: The method of any of aspects 9 through 11, further comprising: transmitting, to the UE, the third grant instructing the UE to decrease a MCS for the third retransmission of the uplink message via the fourth resource.

Aspect 13: The method of any of aspects 1 through 12, further comprising: incrementing a counter based at least in part on the monitoring indicating that the uplink message was unsuccessfully decoded over the first resource; and transmitting the grant indicating the second resource for the retransmission of the uplink message based at least in part on the counter satisfying a threshold.

Aspect 14: The method of any of aspects 1 through 13, further comprising: initiating a timer based at least in part on the monitoring indicating that the uplink message was unsuccessfully decoded over the second resource; and terminating the RA procedure based at least in part on the timer expiring prior to receipt of the uplink message.

Aspect 15: The method of any of aspects 1 through 14, further comprising: identifying a SFN or a slot to monitor for one or both of the uplink message or the retransmission of the uplink message based at least in part on the RAR message.

Aspect 16: The method of any of aspects 1 through 15, wherein transmitting the grant further comprises: transmitting the grant in a control channel corresponding to a connected mode operation by the UE.

Aspect 17: The method of any of aspects 1 through 16, further comprising: receiving, as part of the RA procedure, an initial message comprising a preamble that is allocated to the UE for the RA procedure, wherein transmitting the RAR message is based at least in part one receiving the initial message.

Aspect 18: The method of any of aspects 1 through 17, wherein the uplink message comprises a msg3, an SR message, a connection complete message, or a scheduling information request message.

Aspect 19: The method of any of aspects 1 through 18, wherein the RA procedure comprises a CFRA procedure or a non-contention based RA procedure.

Aspect 20: An apparatus for wireless communications at a base station, comprising: a processor; memory coupled with the processor; and instructions stored in the memory and executable by the processor to cause the apparatus to perform a method of any of aspects 1 through 19.

Aspect 21: An apparatus for wireless communications at a base station, comprising at least one means for performing a method of any of aspects 1 through 19.

Aspect 22: A non-transitory computer-readable medium storing code for wireless communications at a base station, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network device, comprising:
   receiving, as part of a random access procedure, a first uplink message comprising a preamble that is allocated to a user equipment (UE) for the random access procedure;
   transmitting, based at least in part on receiving the first uplink message and as part of the random access procedure, a random access response message to the UE, the random access response message indicating a first resource allocated for transmission of a second uplink message of the random access procedure different than the first uplink message;
   monitoring, as part of the random access procedure and in response to transmitting the random access response message, the first resource for the second uplink message; and
   transmitting, to the UE, a grant indicating a second resource allocated for a retransmission of the second uplink message based at least in part on the monitoring indicating that the second uplink message was unsuccessfully decoded via the first resource.

2. The method of claim 1, further comprising:
   transmitting, to the UE, the grant comprising a transmit power control message instructing the UE to increase a transmit power for the retransmission of the second uplink message.

3. The method of claim 1, further comprising:
   transmitting, to the UE, the grant instructing the UE to decrease a modulation and coding scheme for the retransmission of the second uplink message.

4. The method of claim 1, further comprising:
   transmitting, to the UE, the grant allocating the second resource at a second frequency range that is the same as a first frequency range of the first resource.

5. The method of claim 1, further comprising:
   transmitting, to the UE, the grant allocating the second resource at a second frequency range that partially overlaps with or is different than a first frequency range of the first resource.

6. The method of claim 1, further comprising:
   transmitting, to the UE, the grant comprising a transmit power control message instructing the UE to increase a transmit power for the retransmission of the second uplink message, instructing the UE to decrease a modulation and coding scheme for the retransmission of the second uplink message, and allocating the second resource at a second frequency range that partially overlaps with or is different than a first frequency range of the first resource.

7. The method of claim 1, further comprising:
   monitoring the second resource for the retransmission of the second uplink message; and
   transmitting, to the UE, a second grant indicating a third resource allocated for a second retransmission of the second uplink message based at least in part on the monitoring indicating that the retransmission of the second uplink message was unsuccessfully decoded via the second resource.

8. The method of claim 7, further comprising:
   transmitting, to the UE, the second grant comprising a transmit power control message instructing the UE to increase a transmit power for the second retransmission of the second uplink message via the third resource.

9. The method of claim 7, further comprising:
   monitoring the third resource for the second retransmission of the second uplink message; and
   transmitting, to the UE, a third grant indicating a fourth resource allocated for a third retransmission of the second uplink message based at least in part on the monitoring indicating that the second retransmission of the second uplink message was unsuccessfully decoded via the third resource.

10. The method of claim 9, further comprising:
    transmitting, to the UE, the third grant comprising a transmit power control message instructing the UE to increase a transmit power for the third retransmission of the second uplink message via the fourth resource.

11. The method of claim 9, further comprising:
    transmitting, to the UE, the third grant allocating the fourth resource at a fourth frequency range that that partially overlaps with or is different than a third frequency range of the third resource.

12. The method of claim 9, further comprising:
    transmitting, to the UE, the third grant instructing the UE to decrease a modulation and coding scheme for the third retransmission of the second uplink message via the fourth resource.

13. The method of claim 1, further comprising:
    incrementing a counter based at least in part on the monitoring indicating that the second uplink message was unsuccessfully decoded over the first resource; and
    transmitting the grant indicating the second resource for the retransmission of the second uplink message based at least in part on the counter satisfying a threshold.

14. The method of claim 1, further comprising:
    initiating a timer based at least in part on the monitoring indicating that the second uplink message was unsuccessfully decoded over the second resource; and
    terminating the random access procedure based at least in part on the timer expiring prior to receipt of the second uplink message.

15. The method of claim 1, further comprising:
identifying a system frame number or a slot to monitor for one or both of the second uplink message or the retransmission of the second uplink message based at least in part on the random access response message.

16. The method of claim 1, wherein transmitting the grant further comprises:
transmitting the grant in a control channel corresponding to a connected mode operation by the UE.

17. The method of claim 1, wherein the second uplink message comprises a msg3, a scheduling request message, a connection complete message, or a scheduling information request message.

18. The method of claim 1, wherein the random access procedure comprises a contention free random access procedure or a non-contention based random access procedure.

19. The method of claim 1, wherein the second uplink message comprises uplink scheduling information for communication between the UE and the network device.

20. An apparatus for wireless communications at a network device, comprising:
a processor;
memory coupled with the processor; and
instructions stored in the memory and executable by the processor to cause the apparatus to:
receive, as part of a random access procedure, a first uplink message comprising a preamble that is allocated to a user equipment (UE) for the random access procedure;
transmit, based at least in part on receiving the first uplink message and as part of the random access procedure, a random access response message to the UE, the random access response message indicating a first resource allocated for transmission of a second uplink message of the random access procedure different from the first uplink message;
monitor, as part of the random access procedure and in response to transmitting the random access response message, the first resource for the second uplink message; and
transmit, to the UE, a grant indicating a second resource allocated for a retransmission of the second uplink message based at least in part on the monitoring indicating that the second uplink message was unsuccessfully decoded via the first resource.

21. The apparatus of claim 20, wherein the instructions are further executable by the processor to cause the apparatus to:
transmit, to the UE, the grant comprising a transmit power control message instructing the UE to increase a transmit power for the retransmission of the second uplink message.

22. The apparatus of claim 20, wherein the instructions are further executable by the processor to cause the apparatus to:
transmit, to the UE, the grant instructing the UE to decrease a modulation and coding scheme for the retransmission of the second uplink message.

23. The apparatus of claim 20, wherein the instructions are further executable by the processor to cause the apparatus to:
transmit, to the UE, the grant allocating the second resource at a second frequency range that is the same as a first frequency range of the first resource.

24. The apparatus of claim 20, wherein the instructions are further executable by the processor to cause the apparatus to:
transmit, to the UE, the grant allocating the second resource at a second frequency range that partially overlaps with or is different than a first frequency range of the first resource.

25. The apparatus of claim 20, wherein the instructions are further executable by the processor to cause the apparatus to:
transmit, to the UE, the grant comprising a transmit power control message instructing the UE to increase a transmit power for the retransmission of the second uplink message, instructing the UE to decrease a modulation and coding scheme for the retransmission of the second uplink message, and allocating the second resource at a second frequency range that partially overlaps with or is different than a first frequency range of the first resource.

26. The apparatus of claim 20, wherein the instructions are further executable by the processor to cause the apparatus to:
monitor the second resource for the retransmission of the second uplink message; and
transmit, to the UE, a second grant indicating a third resource allocated for a second retransmission of the second uplink message based at least in part on the monitoring indicating that the retransmission of the second uplink message was unsuccessfully decoded via the second resource.

27. The apparatus of claim 20, wherein the instructions are further executable by the processor to cause the apparatus to:
increment a counter based at least in part on the monitoring indicating that the second uplink message was unsuccessfully decoded over the first resource; and
transmit the grant indicating the second resource for the retransmission of the second uplink message based at least in part on the counter satisfying a threshold.

28. The apparatus of claim 20, wherein the instructions are further executable by the processor to cause the apparatus to:
initiate a timer based at least in part on the monitoring indicating that the second uplink message was unsuccessfully decoded over the second resource; and
terminate the random access procedure based at least in part on the timer expiring prior to receipt of the second uplink message.

29. A non-transitory computer-readable medium storing code for wireless communications at a network device, the code comprising instructions executable by a processor to:
receive, as part of a random access procedure, a first uplink message comprising a preamble that is allocated to a user equipment (UE) for the random access procedure;
transmit, based at least in part on receiving the first uplink message and as part of the random access procedure, a random access response message to the UE, the random access response message indicating a first resource allocated for transmission of a second uplink message of the random access procedure different than the first uplink message;
monitor, as part of the random access procedure and in response to transmitting the random access response message, the first resource for the second uplink message; and
transmit, to the UE, a grant indicating a second resource allocated for a retransmission of the second uplink message based at least in part on the monitoring indicating that the second uplink message was unsuccessfully decoded via the first resource.

30. An apparatus for wireless communications at a network device, comprising:
    means for receiving, as part of a random access procedure, a first uplink message comprising a preamble that is allocated to a user equipment (UE) for the random access procedure;
    means for transmitting, based at least in part on receiving the first uplink message and as part of the random access procedure, a random access response message to the UE, the random access response message indicating a first resource allocated for transmission of a second uplink message of the random access procedure different than the first uplink message;
    means for monitoring, as part of the random access procedure and in response to transmitting the random access response message, the first resource for the second uplink message; and
    means for transmitting, to the UE, a grant indicating a second resource allocated for a retransmission of the second uplink message based at least in part on the monitoring indicating that the second uplink message was unsuccessfully decoded via the first resource.

* * * * *